US009376963B2

(12) United States Patent
Soni et al.

(10) Patent No.: US 9,376,963 B2
(45) Date of Patent: Jun. 28, 2016

(54) DETECTING FLASHBACK BY MONITORING ENGINE-DYNAMIC SPIKES

(71) Applicant: ALSTOM TECHNOLOGY LTD., Baden (CH)

(72) Inventors: Sumit Soni, Jupiter, FL (US); Donald Gauthier, Jupiter, FL (US); Hany Rizkalla, Stuart, FL (US); Khalid Oumejjoud, Palm Beach Gardens, FL (US); Peter Stuttaford, Jupiter, FL (US)

(73) Assignee: ALSTOM TECHNOLOGY LTD., Baden (CH)

( * ) Notice: Subject to any disclaimer, the term of this patent is extended or adjusted under 35 U.S.C. 154(b) by 676 days.

(21) Appl. No.: 13/742,401

(22) Filed: Jan. 16, 2013

(65) Prior Publication Data

US 2014/0196461 A1 Jul. 17, 2014

(51) Int. Cl.
*F02C 9/00* (2006.01)
*F02C 9/28* (2006.01)
*F23D 14/82* (2006.01)
(Continued)

(52) U.S. Cl.
CPC ... *F02C 9/00* (2013.01); *F02C 9/28* (2013.01); *F23D 14/82* (2013.01); *F23N 5/16* (2013.01); *F23R 3/34* (2013.01); *F23D 2209/10* (2013.01); *F23N 2031/28* (2013.01); *F23R 2900/00013* (2013.01)

(58) Field of Classification Search
CPC ....... F02C 9/28; F23D 14/82; F23D 2209/10; F05D 2270/083; F05D 2270/0831
See application file for complete search history.

(56) References Cited

U.S. PATENT DOCUMENTS

| 4,292,801 | A |   | 10/1981 | Wilkes |
| 5,365,787 | A | * | 11/1994 | Hernandez ............. G01H 1/003 324/207.25 |
| 5,706,643 | A | * | 1/1998 | Snyder ..................... F02C 9/28 60/39.281 |

(Continued)

FOREIGN PATENT DOCUMENTS

| EP | 2199680 | 6/2010 |
| EP | 2211101 | 7/2010 |

(Continued)

OTHER PUBLICATIONS

International Preliminary Report on Patentability dated Jul. 30, 2015 for PCT/US2013/078400; filed Dec. 31, 2013.

*Primary Examiner* — Phutthiwat Wongwian
*Assistant Examiner* — Rene Ford
(74) *Attorney, Agent, or Firm* — Shook, Hardy & Bacon L.L.P.

(57) ABSTRACT

A tuning process is provided for dynamically tuning a gas-turbine (GT) engine to correct for flashback events without directly measuring occurrences of the flashback events at the GT engine. Initially, readings are taken that measure low-frequency dynamics at the GT engine. A determination of whether flashback criteria are met by an instantaneous signal that quantifies a detected spike within the measured low-frequency dynamics is carried out, where the flashback criteria include the following: identifying the spike overcomes a multiple of an average of the low-frequency dynamics measured over a predefined period of time; and identifying the spike overcomes a preestablished minimum amplitude. Upon the spike meeting the flashback criteria, a count is added to a running record of spikes, which is compared to an alarm limit. If the alarm limit is triggered, action(s) are invoked to address the flashback events, such as adjusting fuel-flow splits of the GT engine.

20 Claims, 5 Drawing Sheets

(51) Int. Cl.
*F23N 5/16* (2006.01)
*F23R 3/34* (2006.01)

(56) References Cited

U.S. PATENT DOCUMENTS

| | | | | |
|---|---|---|---|---|
| 6,363,315 | B1* | 3/2002 | Love | F02D 41/22 123/478 |
| 6,463,730 | B1* | 10/2002 | Keller | F02C 9/18 60/39.24 |
| 6,535,124 | B1* | 3/2003 | DiTommaso | F02C 9/00 123/294 |
| 6,742,394 | B1* | 6/2004 | Stuttaford | F01D 17/08 60/39.01 |
| 2002/0103547 | A1* | 8/2002 | Nomura | F02C 9/18 700/29 |
| 2002/0129607 | A1* | 9/2002 | Prasad | F02C 9/28 60/772 |
| 2005/0107942 | A1* | 5/2005 | Nomura | F02C 9/28 701/100 |
| 2005/0114071 | A1* | 5/2005 | Hoyte | F01D 17/08 702/140 |
| 2006/0042261 | A1* | 3/2006 | Taware | F23N 5/003 60/773 |
| 2006/0046218 | A1* | 3/2006 | Joklik | F02D 35/0092 431/75 |
| 2007/0157624 | A1* | 7/2007 | Bland | F02C 9/28 60/776 |
| 2007/0180831 | A1* | 8/2007 | Bland | F02C 9/26 60/773 |
| 2007/0214797 | A1* | 9/2007 | Bland | F01D 21/003 60/772 |
| 2007/0271927 | A1* | 11/2007 | Myers | F02C 9/28 60/776 |
| 2008/0134684 | A1* | 6/2008 | Umeh | F02C 7/22 60/772 |
| 2009/0301097 | A1* | 12/2009 | Deuker | F02C 9/28 60/773 |
| 2010/0114376 | A1* | 5/2010 | Guido | F02D 41/26 700/275 |
| 2010/0175384 | A1* | 7/2010 | Kraemer | F23N 5/082 60/773 |
| 2010/0180564 | A1* | 7/2010 | Ziminsky | F02C 9/28 60/39.1 |
| 2010/0180674 | A1* | 7/2010 | Ziminsky | F23N 5/16 73/112.01 |
| 2010/0199680 | A1* | 8/2010 | Nomura | F02C 9/52 60/773 |
| 2010/0280732 | A1* | 11/2010 | Singh | F02C 9/00 701/100 |
| 2010/0300108 | A1 | 12/2010 | Demougeot | |
| 2011/0265487 | A1* | 11/2011 | Gauthier | F02C 7/228 60/773 |
| 2011/0270502 | A1* | 11/2011 | Demougeot | F02C 7/224 701/100 |
| 2012/0035885 | A1* | 2/2012 | Tarassenko | G01H 1/006 702/183 |
| 2012/0102967 | A1* | 5/2012 | Kirzhner | F23N 5/242 60/773 |
| 2013/0219906 | A1* | 8/2013 | Chandler | F02C 9/28 60/773 |

FOREIGN PATENT DOCUMENTS

| | | |
|---|---|---|
| EP | 2211102 | 7/2010 |
| EP | 2249005 | 11/2010 |
| EP | 2249007 | 11/2010 |
| GB | 2485043 | 5/2012 |

* cited by examiner

DETECTING FLASHBACK BY MONITORING ENGINE-DYNAMIC SPIKES

TECHNICAL FIELD

The present invention generally relates to automatically tuning a gas turbine (GT) engine. More specifically, a process and system are identified for providing a control system to automatically tune the GT engine by adjusting fuel-flow splits in response to engine-dynamics spikes, where tuning effectively influences the occurrence of flashback events within combustors of the GT engine.

BACKGROUND OF THE INVENTION

Gas-turbine (GT) engines operate to produce mechanical work or thrust. Specifically, land-based GT engines typically have a generator coupled thereto for the purposes of generating electricity. The shaft of the GT engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Increasingly, a control system is used to regulate the operation of the GT engine. In operation, the control system receives a plurality of indications that communicate the current operating conditions of the GT engine including pressures, temperatures, fuel flow rates, and engine frequencies. In response, the control system makes adjustments to the inputs of the GT engine (e.g., changing fuel-flow splits), thereby changing performance of the GT engine based on the plurality of indications in light of look-up tables coded into the memory of the control system.

Over time, this performance may fall outside a preferred operating range due to mechanical degradation of the gas turbine engine or changes in operational conditions such as ambient temperature or inlet fuel properties (e.g., temperature, pressure, and composition). For instance, the gas turbine engine may begin operating in a state where combustion of the inlet fuel causes unwanted operational dynamics, such as instability or diminished durability. By way of example, total flow of the inlet fuel may have decreased/increased to cause a greater number of flashback events.

Within the field of technology pertaining to GT engines, there exists an undesirable condition called flashback. As used herein, "flashback" refers to an increase in the flame speed within the GT engine's combustor such that it causes the flame to move toward a premixer (i.e., location in which the air and gas are mixed). Traditionally, the onset of flashback is detected using thermocouples. However, the practice of employing thermocouples to monitor flashback results in imprecise readings and leads to cost disadvantages involved in purchasing and maintaining this expensive signal-measurement equipment.

SUMMARY

As discussed above, conventional tools (e.g., thermocouples) for detecting flashback within combustor(s) of the gas-turbine engine are expensive and unreliable (i.e., fail to provide an accurate measurement of flashback events on-the-fly). In accordance with embodiments of the present invention, an automated tuning process is introduced for dynamically tuning a GT engine to correct for flashback events without directly measuring occurrences of the flashback events at the GT engine. Initially, readings are taken that measure low-frequency dynamics at the GT engine. A determination of whether flashback criteria are met by an instantaneous signal that quantifies a detected spike within the measured low-frequency dynamics is carried out, where the flashback criteria include the following: identifying the spike overcomes a multiple of an average of the low-frequency dynamics measured over a predefined period of time; and identifying the spike overcomes a preestablished minimum amplitude. Upon the spike meeting the flashback criteria, a count is added to a running record of spikes, which is compared to an alarm limit. If the alarm limit is triggered, action(s) are invoked to address the flashback events, such as adjusting fuel-flow splits of the GT engine.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disk storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
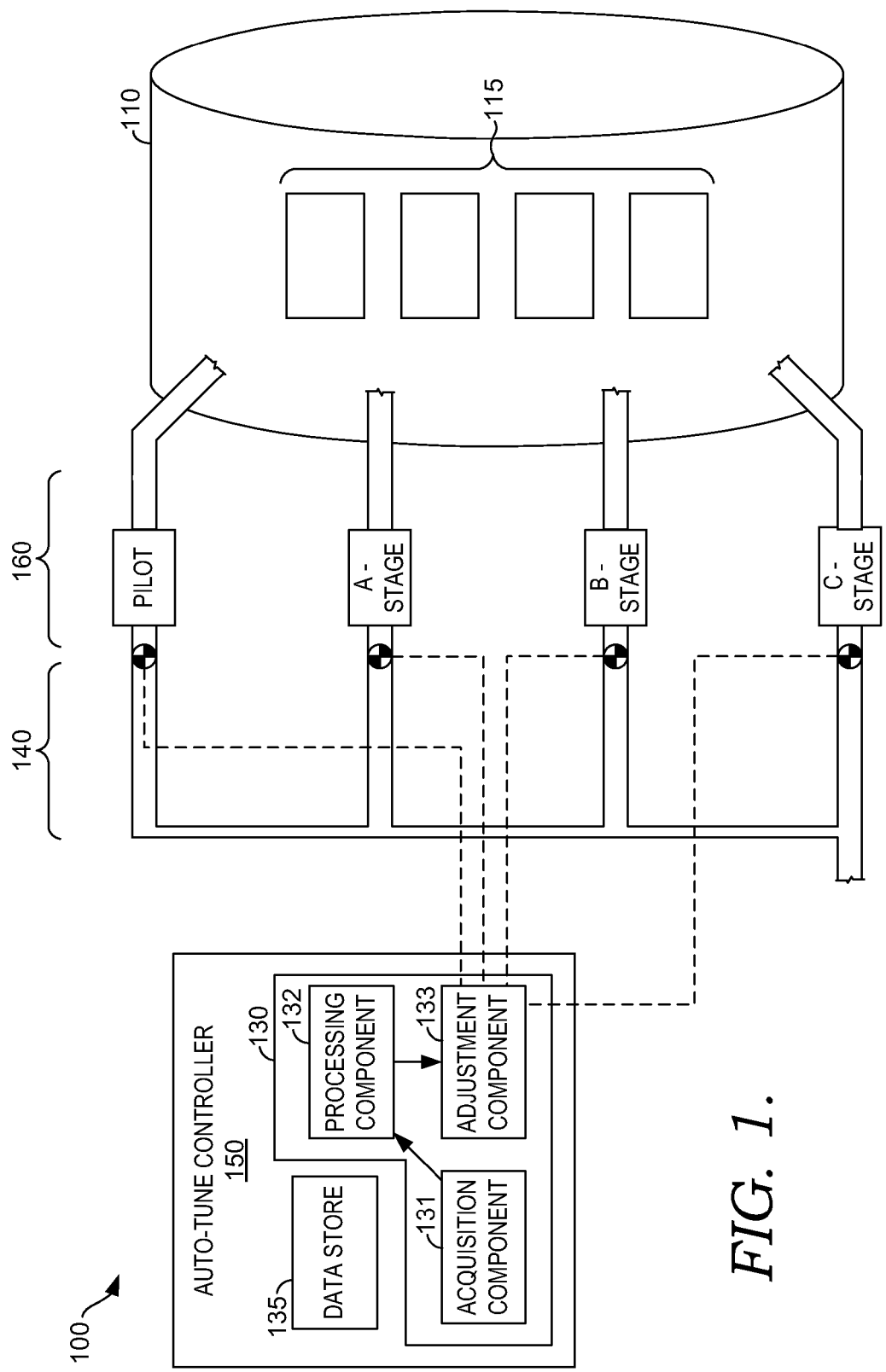
FIG. 1 is a block diagram of an exemplary tuning environment suitable for use in embodiments of the present invention.

Generally, embodiments of the present invention pertain to the concept of detecting the onset of flashbacks within a gas turbine (GT) engine by monitoring and analyzing signals communicating low-frequency dynamics (e.g., lean blowout (LBO) within an event-detection topology. As shown in FIG. 1, the event-detection topology includes an auto-tune controller 150 for acquiring engine-dynamics signals from detection devices (e.g., pressure sensors) and making adjustments to a GT engine based on, in part, analysis of the engine-dynamics signals. One example of analyzing these engine-dynamics signals involves processing the LBO (e.g., using a Fast Fourier Transform (FTF)) and calculating an average of the frequency of spikes for the processed LBO. Once calculated, the average frequency may be used as a first flashback criterion to determine whether a newly detected spike in the LBO triggers an alarm limit. In another instance, a second flashback criterion (e.g., minimum amplitude) may be applied against the newly detected LBO spike to determine whether the LBO spike is substantial enough to cause corrective action(s).

Accordingly, aspects of the present invention may involve a computerized method, implemented by a processing unit (e.g., processing component 132 of FIG. 1), for automatically tuning combustor(s) (see reference numeral 115 of FIG. 1) of the GT engine (see reference numeral 110 of FIG. 1) to address the occurrences of flashback events. The method may involve the following steps: monitoring one or more low-frequency dynamics within the GT engine when tuning a control system for managing operation of the GT engine; and detecting a spike in the monitored low-frequency dynamic(s).

Upon detecting the spike, a determination of whether an amplitude measured from the spike satisfies at least one flashback criterion is carried out. When the spike's measured amplitude satisfies the flashback criterion, a flashback-addressing action is caused to commence (e.g., using the adjustment component 133 of FIG. 1). Typically, the flashback-addressing action (e.g., adjusting fuel-flow splits without affecting a total fuel flow to a particular combustor) serves to influence the occurrences of flashback events within the GT engine. When the spike's measured amplitude fails to satisfy the flashback criterion, the flashback-addressing action is generally not taken.

As described above, embodiments of the present invention generally relate to automatically tuning a gas turbine engine to resolve flashback issues. With reference to FIG. 1, a GT engine 110 is depicted that accommodates a plurality of combustors 115. Generally, for the purpose of discussion, the GT engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110 (see FIG. 2). Further, there may be individual fuel circuits that correspond with each of the plurality of combustors 115 attached to the GT engine 110. As such, it should be appreciated and understood that the auto-tune controller 150, and the tuning process executed thereby (see reference numeral 500 of FIG. 5), can be applied to any number of configurations of GT engines and that the type of GT engines described hereinbelow should not be construed as limiting on the scope of the present invention.

As discussed above, the plurality of combustors 115 may be prone to elevated levels of pressure fluctuation within the combustor liner. This pressure fluctuation is referred to as "combustion dynamics." Left alone, combustion dynamics (e.g., flashback events) can have a dramatic impact on the integrity and life of the plurality of combustors 115, eventually leading to catastrophic failure. These combustion dynamics may be mitigated by adjusting fuel-flow splits of the combustor gas flow between several groups of nozzles within the plurality of combustors 115. Typically, adjusting fuel flow-splits does not result in an increase or decrease in the total fuel flow entering a particular combustor that is presently experiencing adjustment to its fuel-flow splits in accordance with a schedule.

Figure 2:
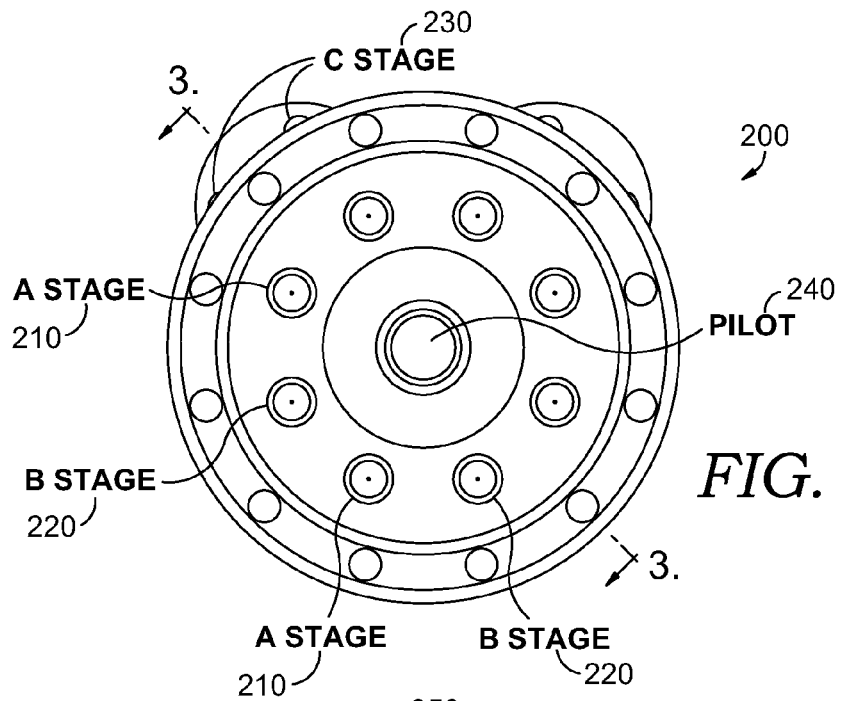
FIG. 2 is a diagrammatic depiction of a fuel circuit for a combustor of a gas-turbine GT engine, in accordance with an embodiment of the present invention.
Figure 3:
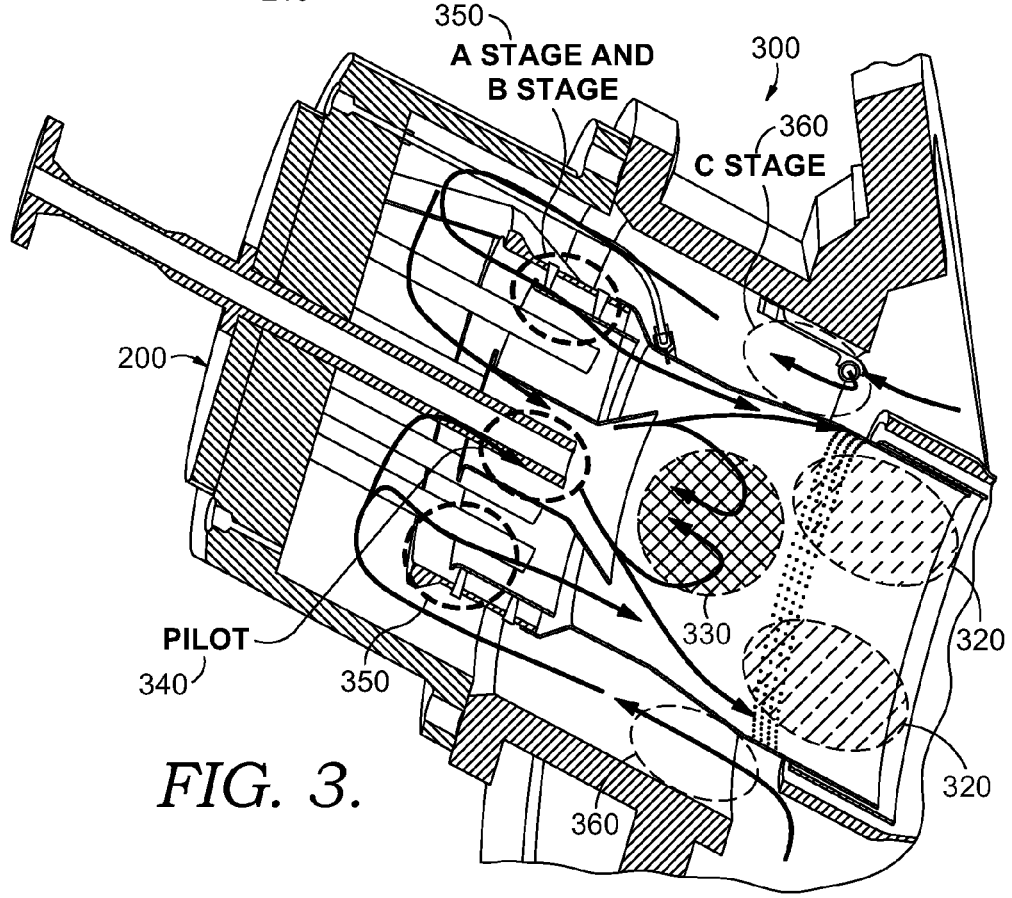
FIG. 3 is a diagrammatic depiction of the combustor of the gas-turbine (GT) engine with an illustrative fuel flow shown, in accordance with an embodiment of the present invention.

For instance, with respect to FIG. 2, the fuel-flow splits may affect which groups of nozzles encounter a reduction or raise in fuel flow. In the example of a 501F engine, there may exist four fuel-flow splits, or circuits: Pilot 240, A-stage 210, B-stage 220, and C-stage 230. With reference to FIG. 3, a location at which fuel is introduced to a combustor 200 of the 501F engine may vary based on which fuel-flow split a particular nozzle participates. As illustrated, nozzles that are grouped in the C-stage 230 participate in fuel-flow splits that are configured to direct fuel into an area 360 of the combustor 200 that is located substantially upstream of a premixing area (i.e., location in which gas and air are mixed). Nozzles that are grouped in the Pilot 240 participate in fuel-flow splits that are configured to direct fuel into an area 340 of the combustor 200, which is located proximate to the premixing area. And, nozzles that are grouped in the A-stage 210 or B-stage 220 participate in fuel-flow splits that are configured to direct fuel into an area 350 of the combustor 200 that is between the area 340 and the area 360.

As illustrated, a flashback area 330 represents an area in which the flashback events frequently occur. The flashback area 330 is proximate to an inlet of the combustor and encroaches on the premixing area, thus creating intermittent bursts that compromise the integrity of the GT engine 300 as well as generating inefficiencies during operation. Meanwhile, areas 320 within the combustor represent typical regions for combustion to occur.

Because total fuel flow is controlled based on power demand of the GT engine 300 (e.g., 501F engine of FIGS. 2 and 3), a sum of all the fuel-flow splits, upon adjustment, does not affect the total fuel flow. Thus, an increase to one fuel-flow split will dictate that one or more other fuel-flow splits are decreased. Some exemplary schemes for balancing adjustment of fuel-flow splits are listed as follows: increase of 1% to Pilot 240 and decrease of 1% to C-stage 230; decrease of 1% to Pilot 240 and increase of 1% to C-stage 230; increase of 1% to Pilot 240 and decrease of 0.5% to both A-stage 210 and B-stage 220; and increase of 1% to C-stage 230 and decrease of 0.5% to both A-stage 210 and B-stage 220.

Upon determining that taking an action to reduce flashback events is appropriate, as more fully discussed below, the auto-tune controller of the FIG. 1 may attempt to alter one fuel-flow split or different combinations of fuel-flow splits incrementally in order to reduce LBO spikes and, consequently, flashback occurrences. One exemplary scheme for altering combinations of fuel-flow splits involves the following logical steps: select an initial fuel-flow split based on a percentage of fuel presently being allocated to nozzles participating in the fuel-flow split (e.g., if the C-stage 230 nozzle is currently receiving a relatively high percentage of the total fuel flow, then select another nozzle to increase); if an increase/decrease in percentage of total fuel flow directed to one or more of the nozzles of the selected fuel-flow split reduces the measured LBO spikes, then continue in same direction; and if not, reverse direction of the increase/decrease in the total-fuel-flow percentage at the selected fuel-flow split. Further, if the increase/decrease in the total-fuel-flow percentage within the nozzle(s) of the selected fuel-flow split fails to substantially affect a change in the LBO spikes, then target other fuel-flow splits for adjustment. In embodiments, the adjustment to the total-fuel-flow percentage is incremental and consistent in amount, allowing for accurately evaluating the effect on the LBO spikes precipitating from the adjustment.

Although some specific logical steps are described above for the purpose of explanation, it should be appreciated and understood that various schemes for adjusting fuel-flow splits may be implemented by an adjustment component 133 of the auto-tune controller 150, and that any other tuning schemes for affecting the occurrences of flashback events (beyond those described herein) may be employed. More details concerning the redistribution of a rate of fuel flow over two or more nozzles of the fuel-flow splits (without affecting the total fuel flow) are found in U.S. patent application Ser. No. 13/053,910, filed on Mar. 22, 2011, entitled "Dynamically Auto-tuning a Gas Turbine Engine." Further, it should be noted that the actions taken by the auto-tune controller 150 of FIG. 1 to reduce and/or ameliorate the occurrences of flashback events within the GT engine 110 may include various engine-tuning operations beyond adjusting fuel-flow splits according to a scheme. For example, upon detecting that flashback events are occurring at a relatively high frequency (i.e., using a measurement of LBO spikes), the auto-tune controller 150 may manipulate configuration settings that manage airflow entering the GT engine 100.

Returning to FIG. 1, the components 131, 132, and 133 of the auto-tune controller and their functionality will now be described. Initially, over time, changes to various environmental factors may influence combustion dynamics of the GT engine 110. For instance, ambient condition changes and/or gas composition variation may cause flashback events to occur within the GT engine 110 at an increased rate. To correct for the increased rate of flashback events, an automatic tuning control system, comprising components 131, 132, and 133 of the auto-tune controller 150 of FIG. 1, is used to assess the state of the GT engine 110 and the plurality of combustors 115 in terms of combustion-dynamics measurements, such as air flow, fuel flows, emissions, heating value of fuel, and pressure distribution (e.g., low-frequency dynamics). Based on an analysis of those measurements, the adequate combustion dynamics are arrived upon by incrementally adjusting, or by making single specific changes to, controllable parameters (e.g., fuel-flow splits) that influence operation of the GT engine 110. Accordingly, embodiments of the present invention concern the auto-tune controller 150 and the associated tuning process that enables automatic tuning of the combustion dynamics using, for example, consistent incremental changes of the fuel-flow splits.

An exemplary tuning process carried out by the auto-tune controller 150 may comprise one or more of the steps described immediately below. Initially, the increased frequency of flashback-event occurrences may be detected by the acquisition component 131, which measures low-frequency dynamics (e.g., LBO spikes) at one or more of the combustors 115. In a specific embodiment, the acquisition component 131 may measure an instantaneous signal of the low-frequency dynamics while monitoring the engine dynamics for the GT engine 110. The acquisition component 131 may also be configured for performing preprocessing operations on the measured instantaneous signal. For instance, the instantaneous signal may be passed through an algorithmic procedure, where the low-frequency dynamics are converted into a plot of pressure (e.g., pounds per square inch (PSI)) as a function of time. The plot (see FIG. 4) may be used to reveal spike(s) in the low-frequency dynamics, which correspond to occurrences of flashback events within the combustors 115.

In another embodiment of preprocessing the instantaneous signal, the acquisition component may dynamically convert a raw input to a measurement having units of PSI. The measured PSI of the low-frequency dynamics is then consumed by the processing component 132 to evaluate whether an action is to be taken by the acquisition component 131, as discussed with more detail above.

Generally, the evaluation conducted by the processing component 132 involves performing an analysis to determine whether the instantaneous signal of the low-frequency dynamics qualifies as a spike that satisfies one or more flashback criteria. Performing the analysis may include, but is not limited to, the following logical steps: calculating an average of the measured low-frequency dynamics over a predefined period of time (e.g., a rolling 30 seconds); determining whether the instantaneous signal overcomes a first predetermined value of the flashback criteria; and determining whether the instantaneous signal overcomes a second predetermined value of the flashback criteria. In an exemplary embodiment, the first predetermined value may represent a multiple of the calculated average, while the second predetermined value may represent a preestablished minimum amplitude of the instantaneous signal. In one example of employing the first predetermined value, the processing component 132 may determine whether the instantaneous signal overcomes a value that is four times the calculated average.

Although various different configurations of the flashback criteria have been described, it should be understood and appreciated that other types of suitable criterion that are applied to determine whether an action should be taken to reduce flashback to an appropriate level may be used, and that embodiments of the present invention are not limited to determining whether a measured instantaneous signal overcomes a first and second predetermined value, as described herein. For instance, embodiments of the present invention contemplate auto-tuning systems that are configured to employ just one of the predetermined values for analyzing the low-frequency dynamics. In another instance, embodiments of the present invention contemplate flashback criteria that comprise one or more of the predetermined values in conjunction with other values/thresholds that can be compared against the low-frequency dynamics, such as dynamically changing value that varies in correspondence with standard deviation bands around the averaged low-frequency dynamics.

The analysis performed at the processing component 132 may further comprise the following logical steps: recognizing that the instantaneous signal overcomes the first and/or the second predetermined value; and adding a count to a running record of spikes detected from the GT engine. Upon adding the count to the running record of spikes to generate an updated running record, the processing component may determine whether the updated running record triggers an alarm limit. When the processing component 132 determines that the alarm limit is not triggered, an indication is sent to the adjustment component 133 that indicates no action should be taken (e.g., the fuel-flow splits are to remain unchanged). When the processing component 132 determines that the alarm limit is triggered, an indication that the instantaneous signal satisfies the one or more flashback criteria is sent to the adjustment component 133. Generally, as discussed above, the adjustment component 133 adjusts one or more fuel-flow splits 160 while maintaining total fuel flow to the GT engine 110 substantially constant. This adjustment typically occurs incident to receiving an indication that the instantaneous signal satisfies one or more flashback criteria. Further, the adjustment may be conducted by adjusting one or more controllable valves 140 that direct a flow of fuel to respective nozzles of the fuel-flow splits 160.

Although a scheme for using the auto-tune controller 150 to take action upon determining that the low-frequency dynamic(s) meet one or more flashback criteria has been described immediately above, it should be understood and appreciated by those of ordinary skill in the art that other types of suitable schemes that adjust fuel-flow splits or other parameters to correct for flashback may be used, and that embodiments of the present invention are not limited to those schemes involving the components 131, 132, and 133 having the functionality described above.

Further, with continued reference to FIG. 1, exemplary features of the auto-tune controller 150 of the exemplary tuning environment 100—suitable for use in embodiments of the present invention—will now be discussed. The auto-tune controller 150 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer (e.g., auto-tune controller 150). In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 150 is provided with the data store 135. Generally, the data store 135 is configured to store information associated with the tuning process or data generated upon monitoring the GT engine 110. In some embodiments, such information may include, without limitation, readings of low-frequency dynamics (e.g., LBO spikes) measured from the GT engine 110 taken during commissioning tuning and/or post-commissioning operation of the GT engine 110. In addition, the data store 135 may be configured to be searchable for suitable access of stored information. For instance, the data store 135 may be searchable for schedules to determine whether the readings overcome one or more flashback criteria. It will be understood and appreciated that the information stored in the data store 135 may be configurable and may include any information relevant to the tuning process. The content and volume of such information are not intended to limit the scope of embodiments of the present invention in any way.

Figure 4:
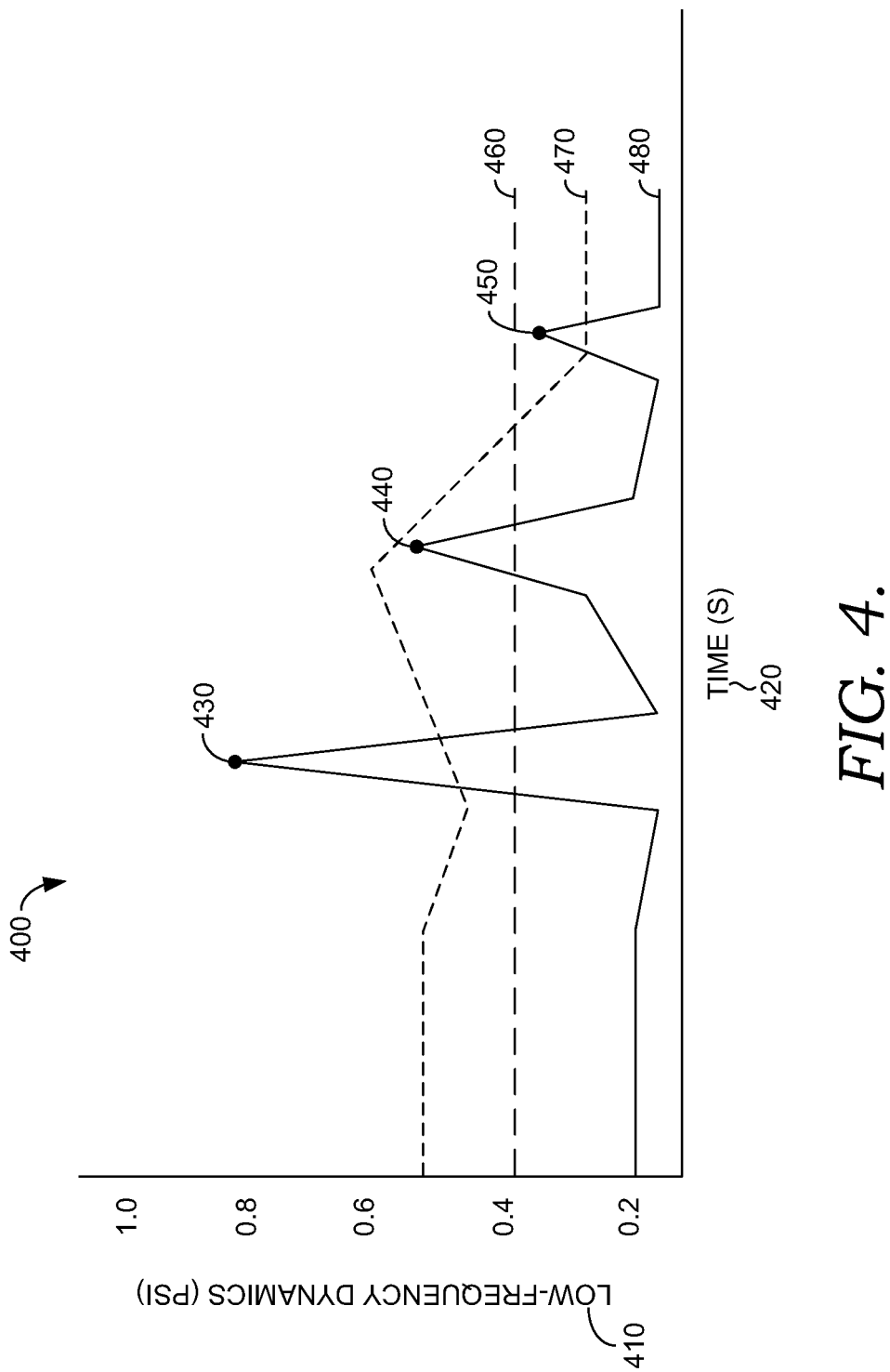
FIG. 4 is a diagrammatic depiction of an operational slope plotted on an exemplary line graph, where the y-axis of the graph represents low-frequency dynamics and the x-axis of the graph represents time, in accordance with embodiments of the present invention.

Turning to FIG. 4, a diagrammatic depiction of an exemplary operational curve 480 dynamically plotted on an exemplary line graph 400 is shown, in accordance with embodiments of the present invention. The line graph 400 includes a y-axis 410 that represents low-frequency dynamics (e.g., LBO spikes in PSI) and an x-axis 420 that represents time (e.g., seconds). The curve 480 includes spikes 430, 440, and 450 in low-frequency dynamics that are demonstrated to correspond with occurrences of flashback events. This correspondence is introduced by embodiments of the present invention and, advantageously allows for monitoring flashback indirectly by using incoming pressure signals presently in place, as opposed to installing and calibrating expensive and unreliable thermocouples to directly track flashback within the combustor.

Also shown on the line graph 400 of FIG. 4 are plotted flashback criteria used to determine whether one or more of the spikes 430, 440, and 450 in low-frequency dynamics qualify to be counted for the purpose of taking action to resolve flashback. The plotted flashback criteria may include any measure and/or calculation previously deemed to separate most points on the curve 480 from significant spikes. As illustrated, the plotted flashback criteria include a first predetermined set of values 460 over time and a second predetermined set of values 470 over time.

The first predetermined set of values 460 represents a pre-established minimum amplitude of the instantaneous pressure signal over time. In this example, the first predetermined set of values 460 is consistently held at 0.4 PSI. However, the first predetermined set of values may be held at any other pressure setting, or may dynamically step up or step down between various pressure settings as a function of operational parameters that are presently detected at the GT engine. The second predetermined set of values 470 represents a rolling average of the low-frequency dynamics over time. The rolling average, for example, may be an average of the measured LBO over a predefined period of time.

Determining whether a particular spike, as indicated by the instantaneous signal of the measured low-frequency dynamics, satisfies the flashback criteria is carried out upon identifying the curve 480 crosses one or more of the sets of values 460 and 470. For instance, if the flashback criteria comprise both of the sets of values 460 and 470, just spike 430 of the line graph 400 satisfies the flashback criteria. In another instance, if the flashback criteria comprise just the first predetermined set of values 460, spikes 430 and 440 of the line graph 400 satisfy the flashback criteria. In yet another instance, if the flashback criteria comprise just the second predetermined set of values 470, spikes 430 and 450 of the line graph 400 satisfy the flashback criteria. And, in still another instance, if the flashback criteria comprise either of the sets of values 460 and 470, spikes 430, 440, and 450 of the line graph 400 satisfy the flashback criteria.

Figure 5:
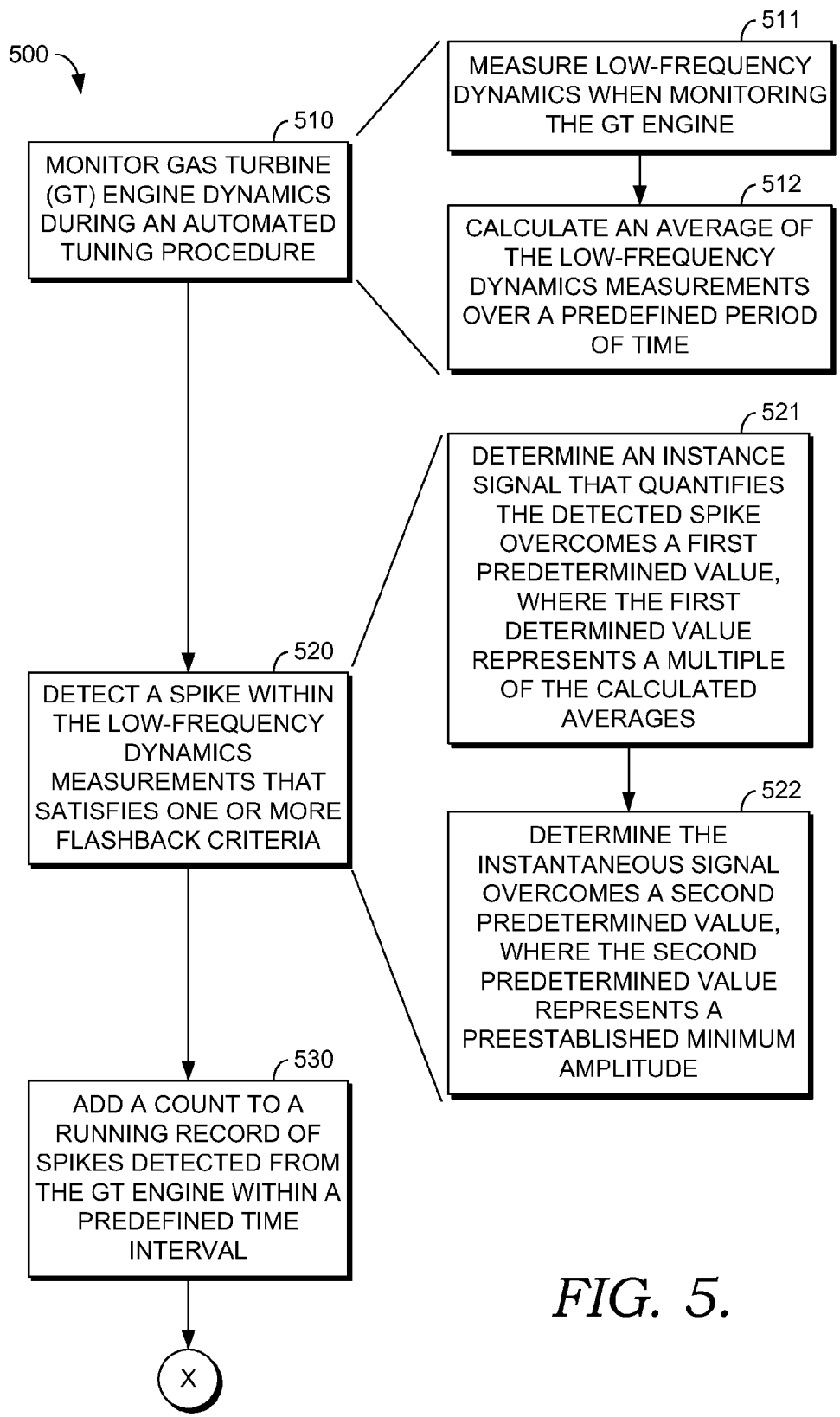
FIG. 5 is a flow diagram of an overall method for carrying out a tuning process that employs one or more flashback criteria for determining whether a spike in the low-frequency dynamics triggers an action to address flashback in the combustor, in accordance with an embodiment of the present invention.
Figure 5:
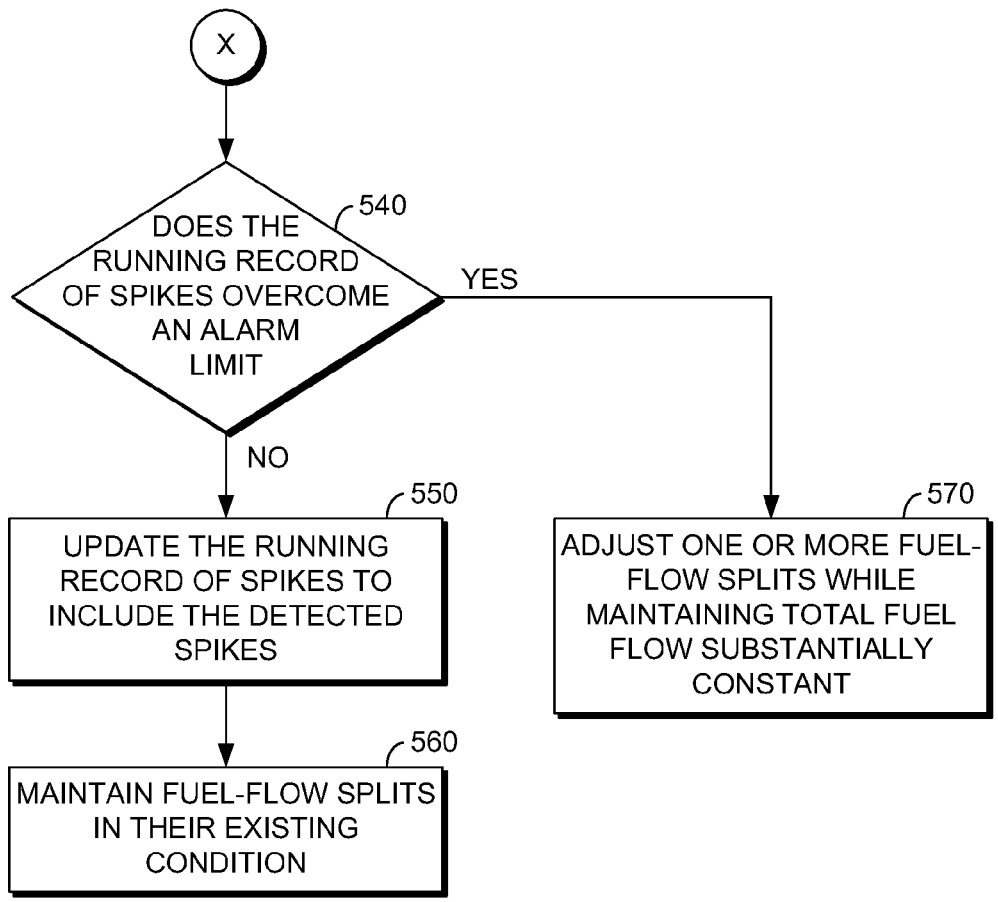

With reference to FIG. 5, exemplary steps of the tuning process will now be discussed. Generally, FIG. 5 illustrates a flow diagram of an overall method 500 for carrying out a tuning process that employs one or more flashback criteria for determining whether a spike in the low-frequency dynamics triggers an action to address flashback in at least one combustor. For instance, the method 500 may address flashback by adjusting one or more fuel-flow splits of a GT engine upon detecting the occurrence of flashback events.

Initially, the overall method 500 includes taking readings from the GT engine. These readings may be taken by monitoring dynamics of the GT engine during an automated tuning procedure, as depicted at block 510. In embodiments, monitoring comprises measuring an instantaneous signal of LBO (see block 511), and averaging the measured LBO over a predefined period of time (see block 512). As mentioned above, flashback-event detection may be carried out using a predefined indicator (being measured on the GT engine) that exemplifies a correlation to flashback, such that flashback spikes typically occur concurrently when flashback spikes occur. In the embodiment described in method 500, LBO (e.g., 10-50 Hz) frequency-band spikes are employed as the predefined indicator. Thus, the method 500 may preemptively attempt to resolve flashback events without actually monitoring flashback (e.g., using thermocouples) but, instead, relying on LBO.

As depicted at block 520, a determination is made of whether a spike, as indicated by the instantaneous signal of the measured LBO, satisfies one or more flashback criteria. In one instance, the determination comprises determining whether the spike overcomes a first predetermined value of the flashback criteria (see block 521), and/or determining whether the spike overcomes a second predetermined value of the flashback criteria (see block 522). Typically, the first predetermined value represents a multiple (e.g., four times) of the averaged LBO, while the second predetermined value represents preestablished minimum amplitude of the instantaneous signal. It should be understood that the factor used as the multiplier to set the second predetermined value (or second threshold) may be fixed or adjustable. For instance, the factor may be changeable based on various conditions, such as being adjusted based on amplitudes of the measured LBO spikes. In this instance, if the average amplitude of the LBO spikes is ten times the average LBO, then the factor is adjusted upward (e.g., multiplier moves from four times average to five times average) in order to provide a meaningful accounting of measurements while eliminating false readings from consideration. Thus, the flashback criteria allow for establishing a range that captures important spikes while discounting other measurements.

Upon recognizing that the spike overcomes the flashback criteria (e.g., either/both the first predetermined value or the second predetermined value), a running record is either generated or, if generated, updated by adding a count to the running record of LBO spikes detected from the GT engine, as depicted at block 530. In other words, this step of the method 500 serves to both register and record the significant LBO spikes over a defined time interval (e.g., thirty seconds), such that the total number of registered spikes that is recorded within the defined time interval is tracked and stored. The running record allows for identifying whether a trend is occurring within the significant spikes.

For instance, if the trend involves simply counting the significant spikes and if the total number of significant spikes is above a certain limit, then the onset of flashback may be assumed. In another instance, if the trend involves recognizing a general increase in the total number of significant spikes from one defined time interval to the next, the onset of flashback may be recognized by comparing the total numbers and analyzing the differences, such that a general upward trend in significant spikes may warrant an action to resolve flashback. In yet another instance, if the trend involves measuring areas under the curve of significant spikes (or under the entire curve of the measured LBO), the onset of flashback may be recognized by aggregating the measured areas and comparing the aggregation against a threshold area.

As depicted at block 540, the method 500 includes the decision of determining whether the updated running record overcomes an alarm limit. The alarm limit may comprise one or more of the instances described immediately above, or may involve any other trigger that can be invoked upon evaluating the significant spikes over the defined time interval. Thus, the alarm limit serves as a condition precedent for taking corrective action (e.g., tuning the GT engine) by the auto-tune controller. Upon determining that the updated running record overcomes the alarm limit, as depicted at block 540, the method 500 involves adjusting fuel-flow splits while maintaining total fuel flow to the GT engine substantially constant. On the other hand, as depicted at blocks 550 and 560, upon determining that the updated running record fails to overcome the alarm limit, the running record is updated and an indication that the fuel-flow splits are to remain unchanged is provided.

Various benefits arising from automatic tuning can be realized when automatic tuning is compared against the current tuning processes. That is, because the tuning process of the present invention can be implemented automatically, the disadvantages of manually tuning are overcome. For instance, automatically tuning can be performed quickly and often, which will substantially prevent degradation that would have occurred before the manual tuning. Further, frequently tuning reduces excess pollutants/promotes lower emissions while improving engine life through reduced combustor dynamics.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for automatically tuning a combustor of a gas turbine (GT) engine to address the occurrences of flashback events, the method comprising:
    monitoring one or more low-frequency dynamics within the GT engine;
    detecting a spike in the one or more monitored low-frequency dynamics;
    determining whether an amplitude measured from the spike satisfies at least one flashback criterion;
    when the spike's measured amplitude satisfies the at least one flashback criterion:
        (1) adding a count to a running record of spikes detected from the GT engine;
        (2) identifying that a number of spikes that satisfy the at least one flashback criterion that are detected within a predefined time interval surpasses a threshold number;
        (3) causing a flashback-addressing action to commence, wherein the flashback-addressing action serves to influence the occurrences of flashback events within the GT engine; and
    when the monitored one or more low-frequency dynamics do not satisfy at least one flashback criterion, refraining from causing the flashback-addressing action.

2. The computerized method of claim 1, further comprising, upon determining that the running record of spikes triggers an alarm limit, causing the flashback-addressing action to commence.

3. The computerized method of claim 2, wherein causing the flashback-addressing action to commence comprises adjusting one or more fuel-flow splits while maintaining a total fuel flow to the GT engine substantially constant.

4. The computerized method of claim 1, wherein monitoring one or more low-frequency dynamics within the GT engine comprises measuring low-frequency dynamics.

5. The computerized method of claim 4, wherein the low-frequency dynamics include lean blowout (LBO) of the GT engine.

6. The computerized method of claim 4, further comprising calculating an average of the one or more low-frequency dynamics over a predefined period of time.

7. The computerized method of claim 6, wherein determining whether an amplitude measured from the spike satisfies at least one flashback criterion comprises determining whether the spike's measured amplitude overcomes a first predetermined value, wherein the first predetermined value represents a multiple of the calculated average of the one or more low-frequency dynamics.

8. The computerized method of claim 7, wherein determining whether an amplitude measured from the spike satisfies at least one flashback criterion comprises determining whether the spike's measured amplitude overcomes a second predetermined value, wherein the second predetermined value represents a preestablished minimum amplitude.

9. The computerized method of claim 8, further comprising adding a count to a running record of spikes detected from the GT engine upon determining that the spike's measured amplitude overcomes the first and second predetermined values.

10. A computerized method, implemented by a processing unit, for automatically tuning a combustor of a GT engine to address the occurrences of flashback events, the method comprising:
    measuring an amplitude of one or more low-frequency dynamics of the GT engine;
    calculating an average of the amplitude of the one or more low-frequency dynamics over a predefined period of time;
    detecting a spike in the amplitude of the one or more measured low-frequency dynamics;
    determining whether the spike's measured amplitude overcomes a first predetermined value, wherein the first predetermined value represents a multiple of the calculated average of the one or more low-frequency dynamics;
    when the spike's measured amplitude overcomes the first predetermined value, causing a flashback-addressing action to commence, wherein the flashback-addressing action serves to influence the occurrences of flashback events within the GT engine; and
    otherwise, refraining from causing the flashback-addressing action.

11. The computerized method of claim 10, further comprising:
    determining whether the spike's measured amplitude overcomes a second predetermined value, wherein the second predetermined value represents a preestablished minimum amplitude.

12. The computerized method of claim 11, further comprising:
    upon determining that the spike's measured amplitude overcomes the first and second predetermined values, adding a count to a running record of spikes detected from the GT engine.

13. A computer system comprising:
    a processor coupled to a computer storage medium, the computer storage medium having stored thereon a plurality of computer software components executable by the processor configured for performing a method of auto-tuning a gas turbine (GT) engine using engine dynamics to adjust for flashback events, the method comprising:
        measuring an amplitude of one or more low-frequency dynamics of the GT engine;
        calculating an average of the amplitude of the one or more low-frequency dynamics over a predefined period of time;
        detecting a spike in the amplitude of the one or more measured low-frequency dynamics;
        determining whether the spike's measured amplitude overcomes a first predetermined value, wherein the first predetermined value represents a multiple of the calculated average of the one or more measured low-frequency dynamics;
        when the spike's measured amplitude overcomes the first predetermined value, causing a flashback-addressing action to commence, wherein the flashback-addressing action serves to influence the occurrences of flashback events within the GT engine; and
        otherwise, refraining from causing the flashback-addressing action.

14. The computer system of claim 13, wherein causing the flashback-addressing action to commence comprises adjusting one or more fuel-flow splits while maintaining a total fuel flow to the GT engine substantially constant.

15. The computer system of claim 13, wherein the low-frequency dynamics include LBO of the GT engine.

16. The computer system of claim 13, further comprising:
determining whether the spike's measured amplitude overcomes a second predetermined value, wherein the second predetermined value represents a preestablished minimum amplitude.

17. The computer system of claim 16, further comprising:
adding a count to a running record of spikes detected from the GT engine upon determining that the spike's measured amplitude overcomes the first and second predetermined values; and
upon adding the count to the running record of spikes, determining whether a new running record or spikes triggers an alarm limit.

18. The computer system of claim 17, further comprising:
upon determining the new running record of spikes triggers the alarm limit, adjusting one or more fuel-flow splits while maintaining total fuel flow to the GT engine substantially constant.

19. The computer system of claim 17, further comprising:
upon determining the new running record of spikes does not trigger the alarm limit, refraining from adjusting one or more fuel-flow splits.

20. The computer system of claim 13, wherein the first predetermined value is four times the calculated average of the measured low-frequency dynamics.

\* \* \* \* \*